US005960701A

United States Patent [19]

Reese et al.

[11] Patent Number: 5,960,701

[45] Date of Patent: Oct. 5, 1999

[54] MACHINE FOR DISPENSING BEVERAGES OF SUBSTANTIALLY UNIFORM CONSISTENCY

[76] Inventors: Joseph J. Reese, 4023 S.E. Fairway East, Stuart, Fla. 34997; John F. Hasson, 608-A Knollcrest Pl., Cockeysville, Md. 21030

[21] Appl. No.: 09/059,300

[22] Filed: Apr. 14, 1998

[51] Int. Cl.$^6$ ............................ A23L 2/00; B02C 19/00

[52] U.S. Cl. ............................ 99/275; 99/300; 99/484; 222/135; 222/146.6

[58] Field of Search ............................ 99/275, 323.3, 99/286, 300, 316, 484, 486; 366/154.1, 155.1; 222/135, 146.6, 640, 132, 129.3, 144.5, 158; 241/101.2, 92, 95, DIG. 17

[56] References Cited

U.S. PATENT DOCUMENTS

| | | | |
|---|---|---|---|
| 1,681,929 | 8/1928 | De Armond et al. . | |
| 2,462,019 | 2/1949 | Bowman . | |
| 2,552,933 | 5/1951 | Browne . | |
| 2,707,911 | 5/1955 | Charpiat . | |
| 2,712,887 | 7/1955 | King . | |
| 2,724,949 | 11/1955 | Kattis . | |
| 3,106,895 | 10/1963 | Hood . | |
| 3,156,103 | 11/1964 | Ross . | |
| 3,297,061 | 1/1967 | Nimee . | |
| 3,335,911 | 8/1967 | Stutz . | |
| 3,428,218 | 2/1969 | Coja . | |
| 3,441,176 | 4/1969 | Reynolds et al. . | |
| 3,548,280 | 12/1970 | Cockroft . | |
| 3,568,887 | 3/1971 | Jacobs et al. . | |
| 3,671,020 | 6/1972 | Krup . | |
| 3,702,666 | 11/1972 | Stano . | |
| 3,791,597 | 2/1974 | Walter et al. . | |
| 3,837,587 | 9/1974 | Walter et al. . | |
| 3,987,715 | 10/1976 | Muller . | |
| 4,027,783 | 6/1977 | Branch et al. . | |
| 4,207,994 | 6/1980 | Offlee, Sr. | 222/146.6 |
| 4,319,698 | 3/1982 | Tomiyama et al. . | |
| 4,324,494 | 4/1982 | Pryor et al. . | |
| 4,517,651 | 5/1985 | Kawasaki et al. . | |
| 4,566,287 | 1/1986 | Schmidt et al. . | |
| 4,595,131 | 6/1986 | Ruskin et al. . | |
| 4,649,809 | 3/1987 | Kanezashi . | |
| 4,653,281 | 3/1987 | Van Der Veer . | |
| 4,681,030 | 7/1987 | Herbert . | |
| 4,767,068 | 8/1988 | Ando | 241/95 X |
| 4,776,489 | 10/1988 | Tarlow et al. . | |
| 4,786,002 | 11/1988 | Mitsubayashi et al. . | |
| 4,867,052 | 9/1989 | Cipelletti . | |
| 4,919,075 | 4/1990 | Himi . | |
| 4,960,228 | 10/1990 | Takahashi et al. . | |
| 4,982,877 | 1/1991 | Burton . | |
| 4,993,593 | 2/1991 | Fabiano et al. . | |
| 4,998,677 | 3/1991 | Gallaher | 241/101.2 X |
| 5,050,809 | 9/1991 | Rupp | 99/484 X |
| 5,109,759 | 5/1992 | Asahara . | |
| 5,181,631 | 1/1993 | Credle, Jr. . | |
| 5,323,691 | 6/1994 | Reese et al. . | |
| 5,368,196 | 11/1994 | Hellenberg et al. . | |
| 5,405,054 | 4/1995 | Thomas . | |
| 5,619,901 | 4/1997 | Reese et al. . | |

*Primary Examiner*—Timothy F. Simone
*Attorney, Agent, or Firm*—Rosenberg, Klein & Bilker

[57] ABSTRACT

A machine (10) for dispensing beverages of substantially uniform consistency containing shaved ice is provided and includes a housing (14), a blending assembly (12, 13), a plurality of receptacles 20 disposed within an upper housing portion (15), and a plurality of valves (39) and a manifold (22) in fluid communication with the plurality of receptacles (20) for delivering a measured volume of a selected drink mix to the blending assembly (12, 13). The machine also includes an ice shaver (21) located in the housing for delivering a precise amount of shaved ice to the blending assembly (12, 13). The ice shaver includes the rotating ice shaving blade (36) that is controlled to rotate through a predetermined number of revolutions, to thereby consistently deliver a predetermined quantity of shaved ice to the blending assembly (12, 13) irrespective of a hardness of the ice (19) being shaved.

21 Claims, 12 Drawing Sheets

MACHINE FOR DISPENSING BEVERAGES OF SUBSTANTIALLY UNIFORM CONSISTENCY

BACKGROUND OF THE INVENTION

1. Field of the Invention

The present invention is directed to a beverage dispensing machine incorporating both a blending assembly and a shaved ice delivery assembly. More in particular, the present invention is directed to a machine for dispensing beverages of substantially uniform consistency wherein a precise measured volume of drink mix is combined with a precise quantity of shaved ice. Further, the present invention is directed to a beverage dispensing machine wherein the shaved ice is delivered from rotating ice shaving blades which are controlled to rotate through a predetermined number of revolutions. Still further, the present invention is directed to a beverage dispensing machine having portion control valves formed of low mass components so that the valve may be operated rapidly, wherein the low mass components are releasably coupled to a piston subassembly for easy removal and cleaning. Still more in particular, the present invention is directed to a beverage dispensing machine having separate and distinct controllers, wherein one controller controls the delivery of the shaved ice and the other controller controls the operation of a blender, and may further control the operation of a plurality of dispensing valves.

2. Prior Art

Beverage dispensing machines are well known in the art. In machines such as that disclosed in U.S. Pat. No. 4,681,030, a blender and ice shaver are combined in a common housing for preparing drinks once a user manually adds a drink mix to the blending cup. Such systems use a cam type controller for sequencing the operation of the blender and ice shaver however, while such systems automate the ice delivery and blending operations, they provide no ability to control the portion of the drink mix which is added to form the beverage and do not provide a precise quantity of shaved ice to the blender.

In other systems, drink mixes are automatically delivered by controlling the amount of time that a valve is opened. While such systems attempt to control the volume of drink mix delivered by restricting the flow rate of the drink mix supplied to the valve, they do not provide accurate portion control of the beverage delivered thereto.

In still other systems, such as that disclosed in the inventor's prior U.S. Pat. No. 5,323,691, some improvement over the deficiencies of the prior systems was obtained. However, there was a need to provide a more accurate portion control and to provide for adjustment of the portion of drink mix dispensed. Further, there was a need for a more accurate delivery of the quantity of shaved ice that was dispensed, so that uniformly consistent drinks can be repeatedly produced. Further, such systems utilized a single microprocessor control system which had to withstand the start-up surges from both the blender and ice shaver motors which started in quick succession, and which in a commercial environment were repeatedly generated. These and other deficiencies of the prior art have been overcome by the instant invention as described herein.

SUMMARY OF THE INVENTION

A machine for dispensing beverages of substantially uniform consistency containing shaved ice is provided. The machine includes a housing, and a blending assembly disposed within the housing for blending constituents of a beverage for a predetermined time period. The machine includes a plurality of receptacles disposed within the housing for holding respective drink mixes therein. Located within the housing there is an assembly coupled in fluid communication with the plurality of receptacles for delivering a measured volume of a selected drink mix to the blending assembly. The machine also includes an ice shaver assembly located in the housing for delivering a precise amount of shaved ice to the blending assembly. The ice shaver assembly includes a rotating ice shaving blade and an assembly for controlling rotation of the ice shaving blade to rotate through a predetermined number of revolutions, a predetermined quantity of ice thereby being consistently delivered to the blending assembly irrespective of the hardness of ice being shaved.

Looking at the machine for dispensing beverages from another aspect, such may be seen to include a housing, a blending assembly disposed within the housing for blending constituents of a beverage, and an ice shaver assembly located in the housing for delivering a predetermined amount of shaved ice to the blending assembly. The machine is further seen to include a first controller electrically coupled to the ice shaver assembly for controlling the delivery of the predetermined amount of ice. The machine still further includes a second controller separate and distinct from the first controller and electrically coupled to the blending assembly for controlling the blending assembly to operate for a predetermined duration. A plurality of receptacles are disposed within the housing for holding respective drink mixes therein, and an assembly located in the housing and coupled in fluid communication with the plurality of receptacles delivers a measured volume of a selected drink mix to the blending assembly. The assembly for delivering the measured volume is electrically coupled to one of the first and second controllers for initiating dispensing of the measured volume.

Still from another aspect, the machine for dispensing beverages of substantially uniform consistency includes a housing, a blending assembly disposed within the housing for blended constituents of a beverage for a predetermined time period, and an ice shaver assembly located in the housing for delivering a predetermined amount of shaved ice to the blending assembly. A plurality of receptacles disposed within the housing for holding respective drink mixes therein is also included. The machine also includes a plurality of valves respectively coupled to the plurality of receptacles, each of the valves including an internal chamber having a fluid receiving volume of predetermined size alternately filled by a respective drink mix and released therefrom to define the measured volume thereof. Still further, the machine includes a plurality of low mass annular spacer elements that are selectively releasably coupled within the internal chamber of the valves for reducing the fluid receiving volume and thereby altering the measured volume.

Accordingly, it is an object of the present invention to provide a beverage dispensing machine which controls the portion of the drink mix dispensed precisely, and precisely controls the amount of shaved ice dispensed as well, to provide uniformly consistent beverages.

It is another object of the present invention to provide a portion control valve of relatively low mass so as to be rapidly actuatable, for filling an internal chamber thereof and subsequently dispensing the measured volume of drink mix therefrom.

It is a further object of the present invention to provide a portion control valve having an integrally formed retainer for releasably coupling a relatively low mass solenoid armature to a piston rod thereof.

It is yet another object of the present invention to provide an ice shaver which is controlled to deliver a precise predetermined quantity of shaved ice.

It is yet another object of the present invention to provide two separate and distinct controllers, one controller being electrically coupled to the ice shaver for controlling the delivery of the precise predetermined amount of shaved ice, and the other controller being electrically coupled to a blender for controlling the blender to operate for a predetermined duration.

These and other objects of the present invention will become apparent from a reading of the following Specification taken in conjunction with the included Drawings.

DESCRIPTION OF THE PREFERRED EMBODIMENT

Figure 1:
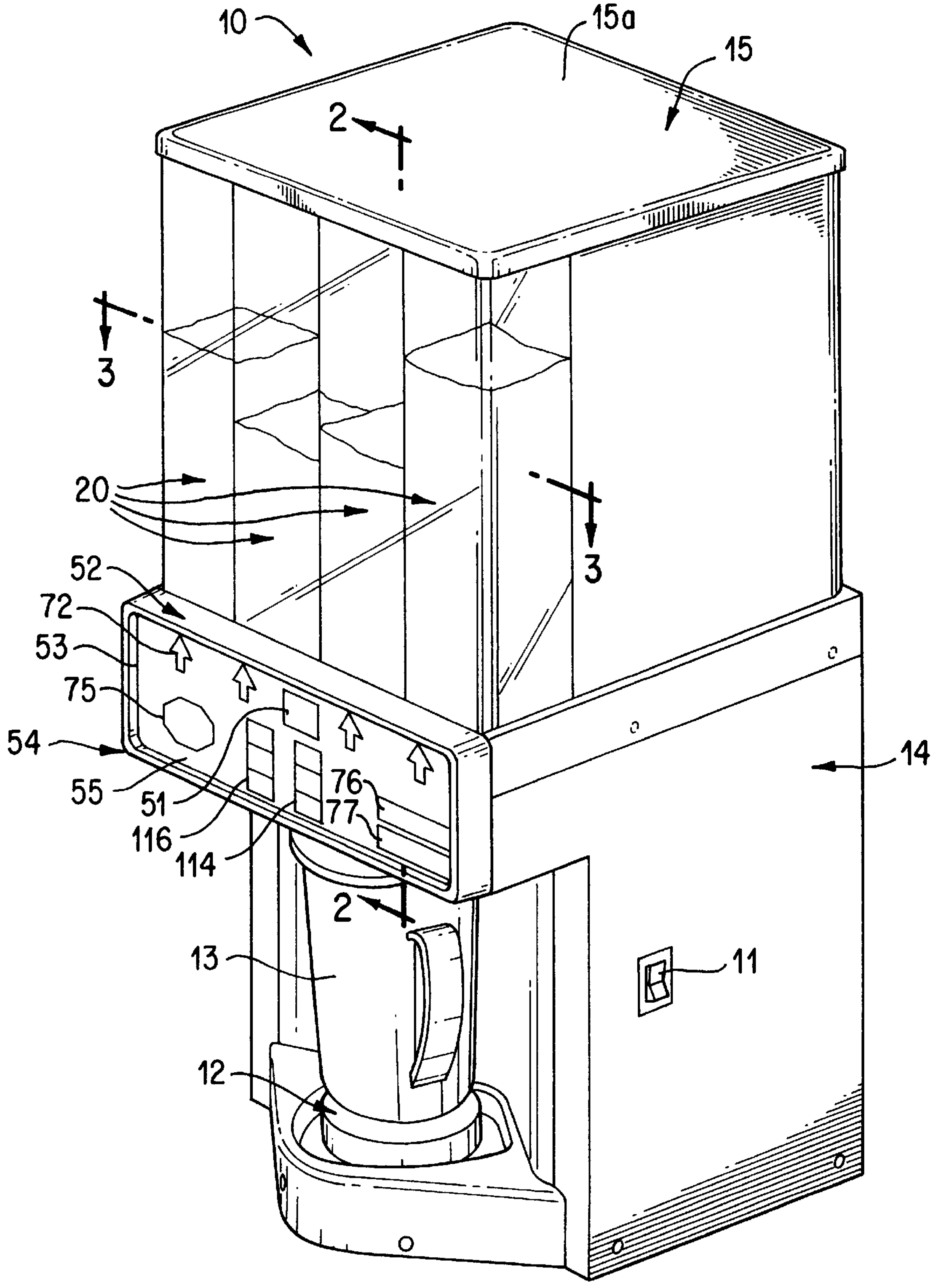
FIG. 1 is a perspective view of the beverage dispensing machine of the present invention.

Referring to FIGS. 1–11, there is shown, the beverage dispensing machine 10 for dispensing beverages of substantially uniform consistency containing shaved ice. As will be seen in following paragraphs, beverage dispensing machine 10 is specifically directed to the concept of accurately proportioning both the ice and drink mix constituents, and controlling the operation of a blender for consecutively providing substantially uniformly consistent drinks.

With reference to FIGS. 1–5, the beverage dispensing machine 10 includes an on/off switch 11, a blender or mixing device 12 into which a mixing container 13 is engaged for pouring the mixed drinks into suitable glasses subsequent to the dispensing and mixing operations. The machine 10 further includes a frame or housing 14 having an upper housing portion 15 mounted thereon.

The upper housing 15 has a transverse interior wall 16 dividing the upper housing 15 into a front compartment 17 and a rear compartment 18. The rear compartment 18 provides a reservoir for ice cubes 19 which are to be fed to an ice shaver 21. The front compartment 17 houses a plurality of beverage receptacles 20, each containing a liquid drink mix which may be selectively combined with shaved ice. The upper housing 15 is covered by a removable lid 15*a*. The upper housing 15 may be formed of any suitable material, however, an impact resistant plastic material that is either transparent or translucent is preferred so that the levels of the beverages or drink mixes in the respective receptacles 20 are readily visible to the user at all times, as is the level of ice in the reservoir 18. The lid 15*a* may be lifted off, and the beverages or mixes, as well as the ice, may be replenished quickly and conveniently.

In a typical product application in a restaurant or bar, the receptacles 20 may be filled with drink mixes for pina coladas, frozen daiquiris, margaritas, bloody marys, and the like. The particular flavored mixes may include alcohol, or the non-alcoholic flavorings. Although four beverage receptacles 20 are shown, it should be understood that any reasonable number of receptacles 20 may be utilized, including a fewer number in order to provide for larger volume receptacles 20.

Figure 5:
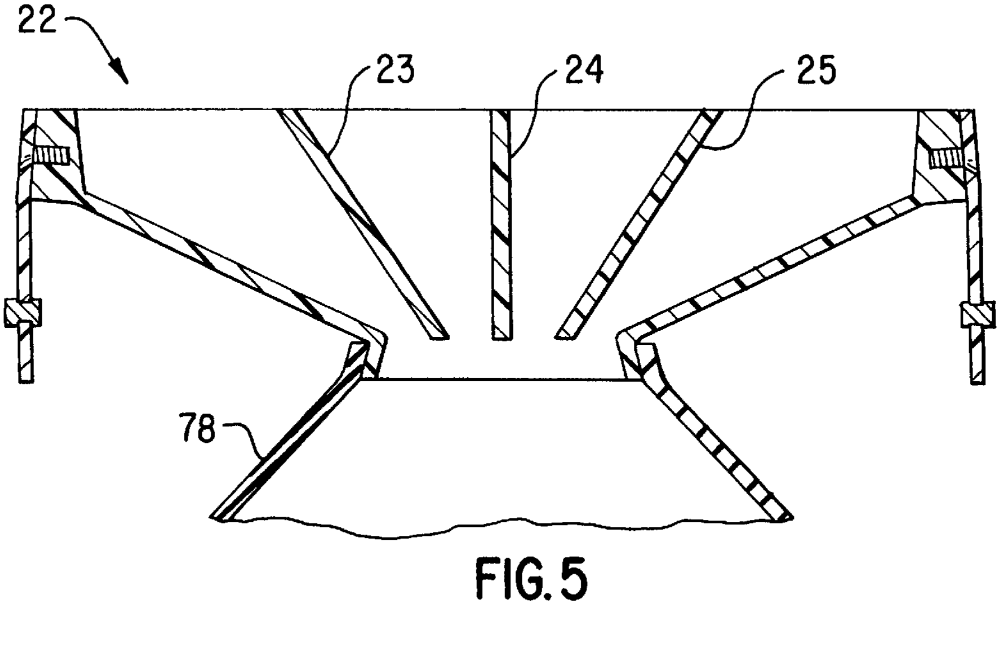
FIG. 5 is a cross-sectional view taken along the section line 5—5 of FIG. 4.

The beverage receptacles 20 are vertically-oriented and are arranged in a side-by-side relationship with respect to each other. Each receptacle 20 dispenses the drink mix or other beverage composition into a manifold 22 that, as shown in FIG. 5, is provided with interior baffles 23, 24 and 25, respectively, for efficiently guiding the beverages dispensed from a particular receptacle 20 into the drink mixing container 13 of the blender 12. Separate tubes may also be used to carry the drink mix from each receptacle 20 to the container 13.

Figure 2:
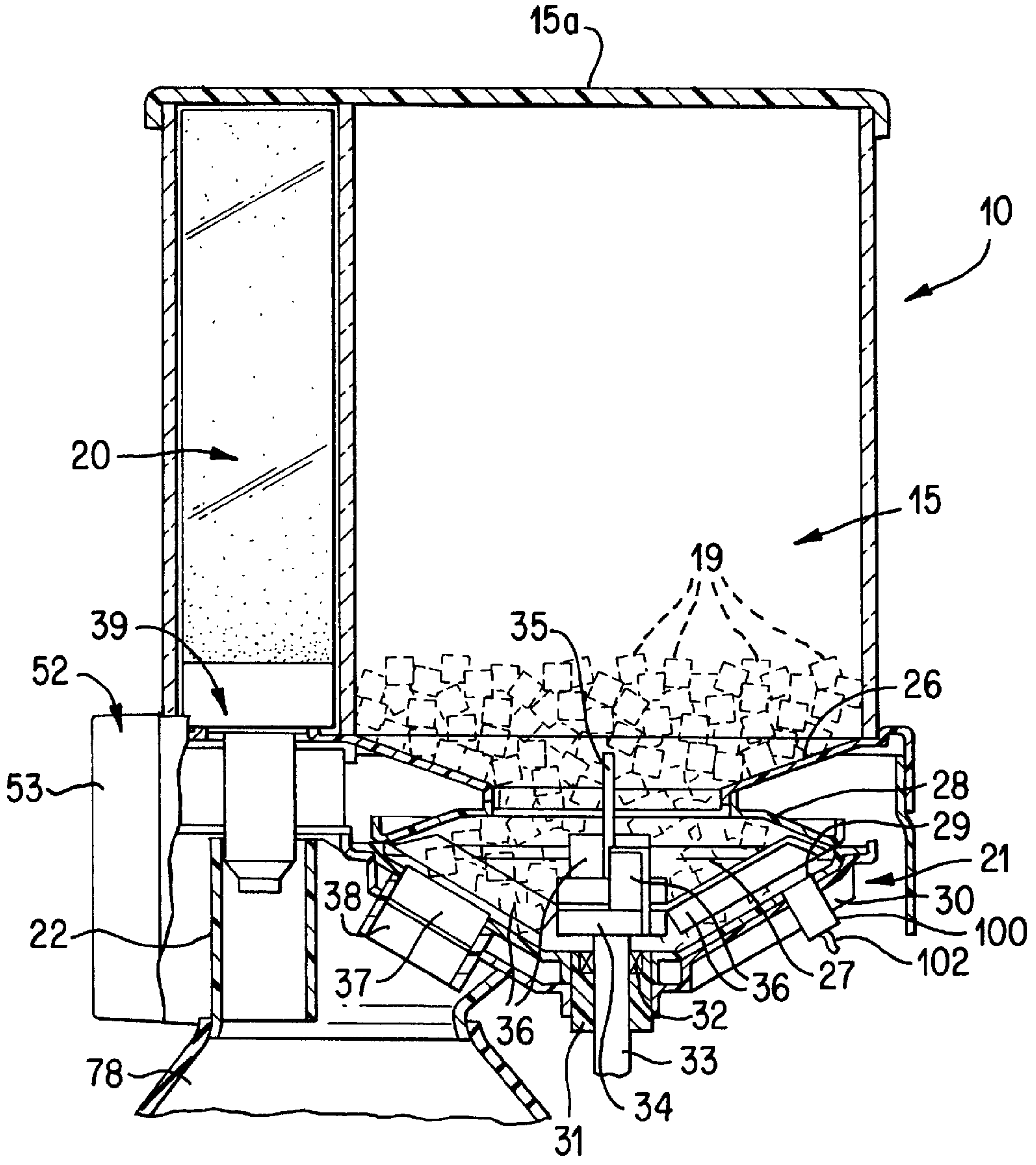
FIG. 2 is a longitudinal sectional view taken along the section line 2—2 of FIG. 1.
Figure 3:
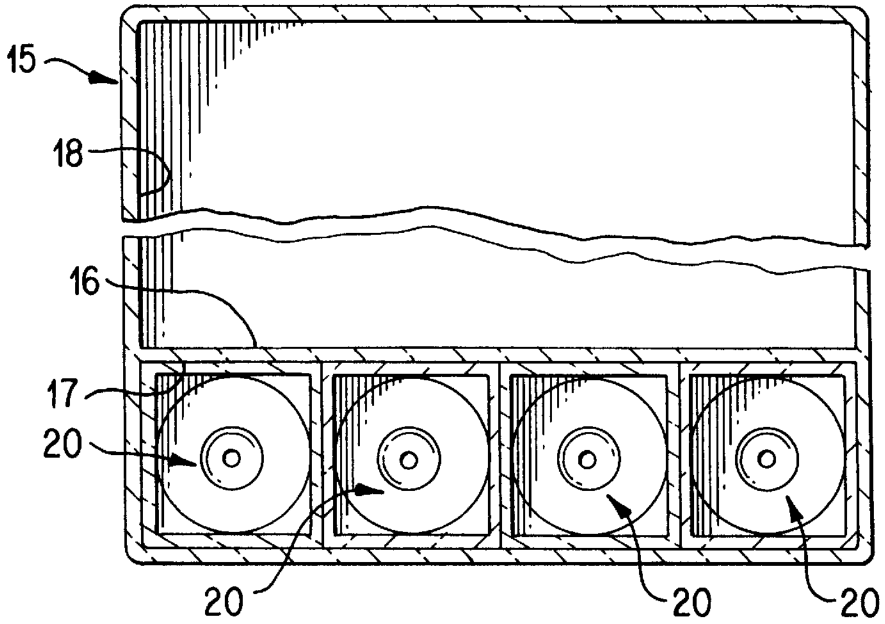
FIG. 3 is a cross-sectional view taken along the section line 3—3 of FIG. 1.

With more specific reference to FIG. 2, the ice cubes 19 are fed by gravity and rotation of the ice shaving blades 36 through a funnel-shaped top cover 26 and into a blade chamber 27 formed by a hood 28 and a funnel-shaped lower cover 29. The lower cover 29 is mounted on a shaver support 30 which has a collar 31 retaining a bearing 32. The bearing 32 rotatably journals a shaft 33 connected to an ice shaver motor, not shown, but is conventional and well known in the art, and therefore not further detailed herein. The shaft 33 has a hub 34 which may carry an agitator 35 and a plurality of angularly spaced rotary blades 36 within the blade chamber 27. These rotary blades 36 cooperate with a stationary blade 37 to shave the ice, wherein the shaved ice falls through a shoot 38 into the mixing container 13 of blender 12, through a lid 78. Rotation of the blades is monitored by a magnetic encoder sensor 100 having a cable 102 extending therefrom. The use of sensor 100 will be further described in following paragraphs.

Figure 6:
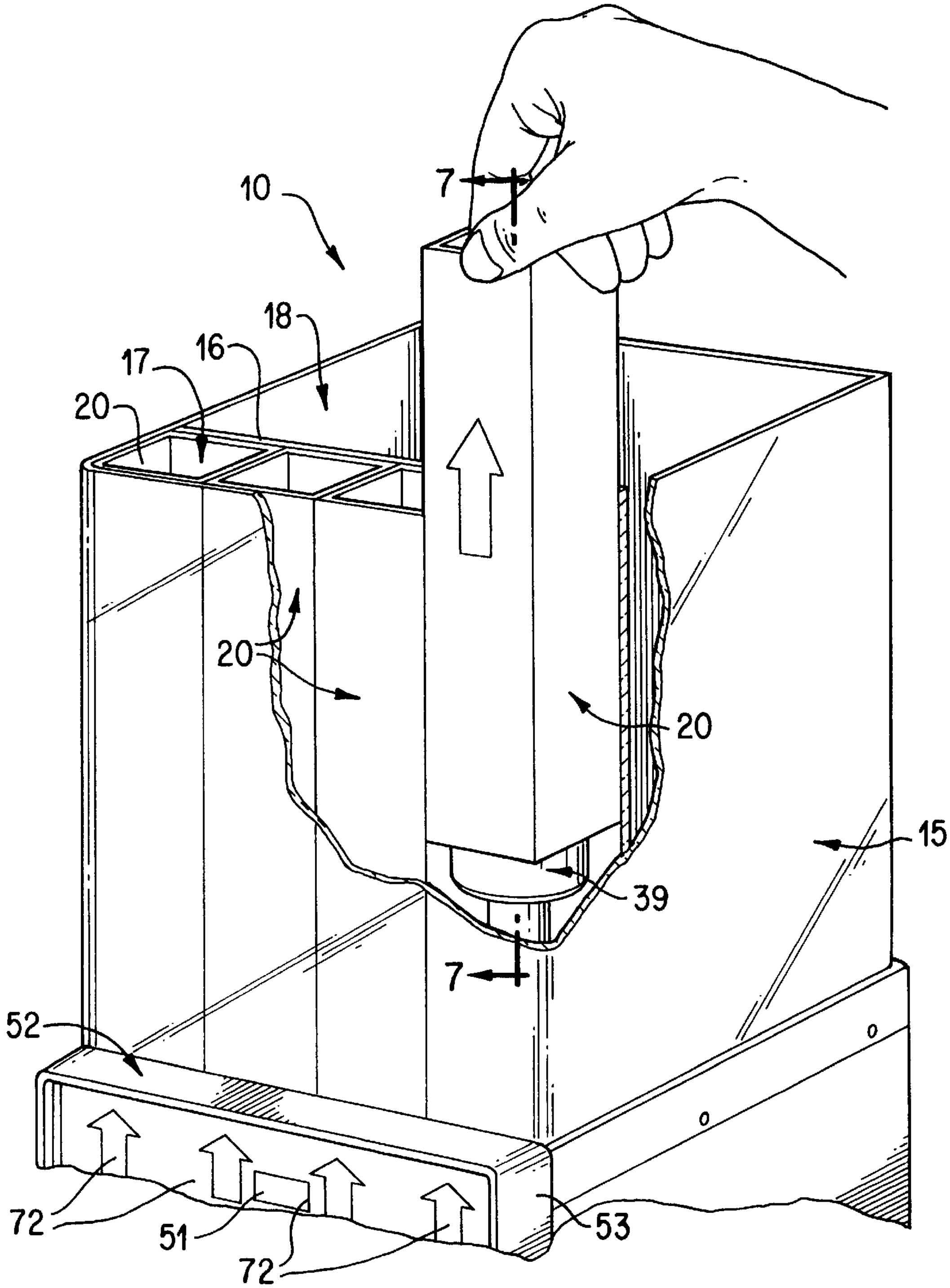
FIG. 6 is a partial perspective view of the top of the machine showing one of the beverage receptacles being lifted out of the upper housing.

As shown in FIG. 6, each of the beverage receptacles 20 can be lifted out of the upper housing 15 subsequent to removal of the lid 15*a*. Such permits the "drink tubes" to be filled at a remote location, such as over a sink, and then subsequently installed within the front compartment 17. Such simplified removal further facilitates the cleaning of the machine.

Figure 7:
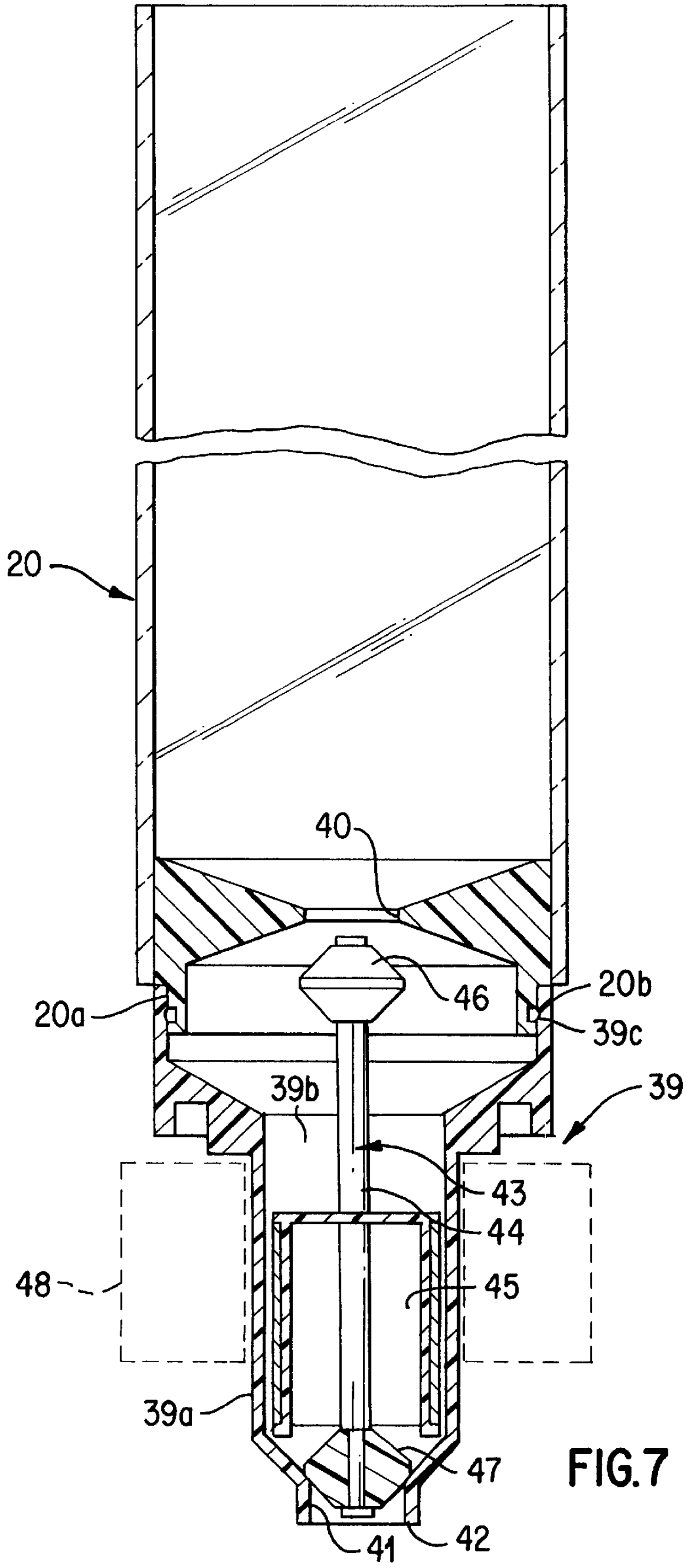
FIG. 7 is a longitudinal section view of one of the beverage receptacles taken along the section line 7—7 of FIG. 6.
Figure 8:
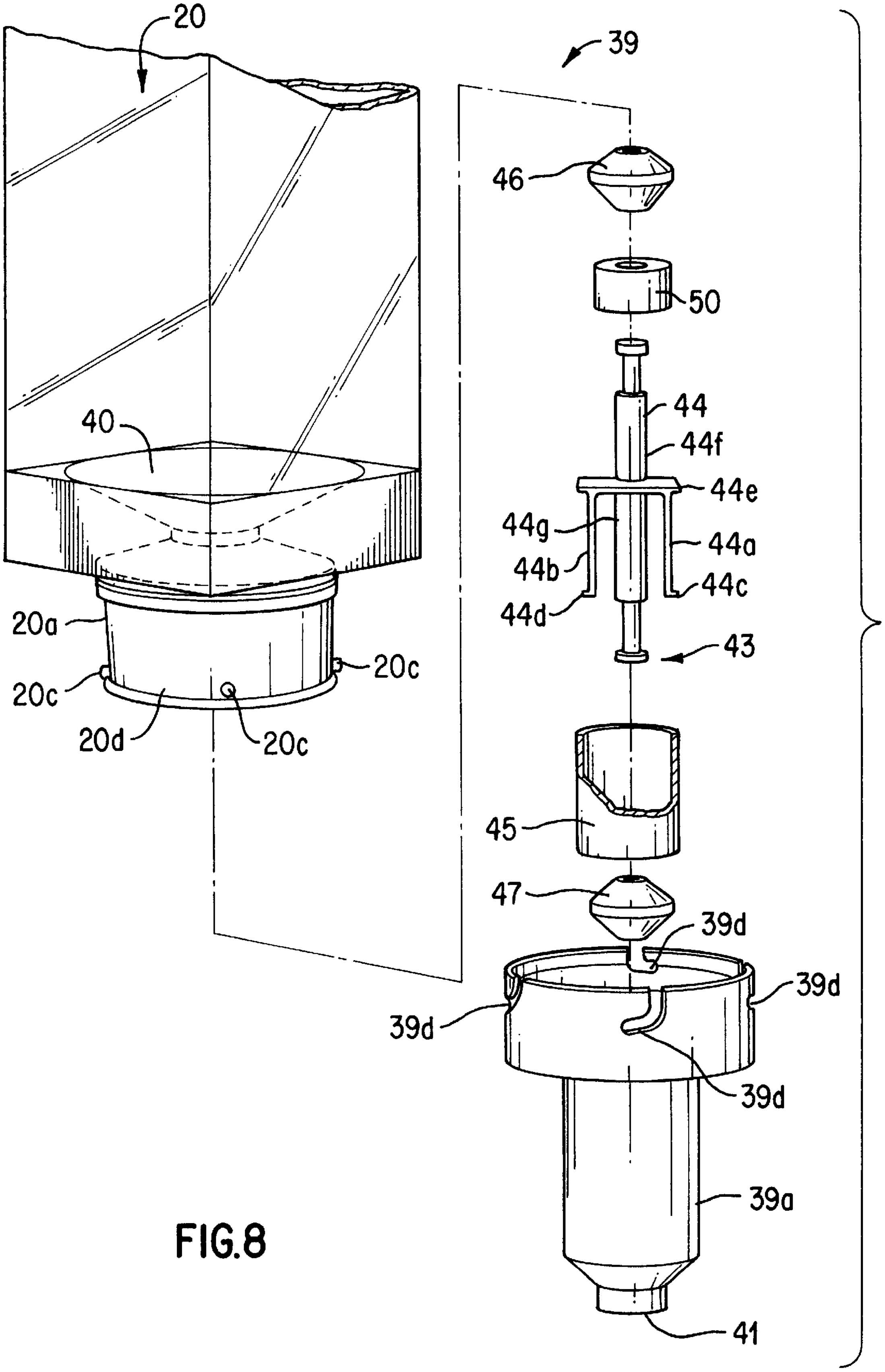
FIG. 8 is an exploded view of the components of the valve assembly of one of the beverage receptacles.

Referring now to FIGS. 7 and 8, there is shown, the proportioning valve assembly 39 coupled to the lower end 20*a* of a respective beverage receptacle 20. Each of the plurality of beverage receptacles 20 are similarly constructed to that shown in FIGS. 7 and 8. The lower portion 20*a* of each beverage receptacle 20 has a port 40 at the bottom end of receptacle 20 against which an upper valve member 46 seats to close the port 40.

The valve assembly 39 includes a piston subassembly 43 which is displaceable within the valve housing 39*a*. The piston subassembly 43 includes a piston rod 44 which carries a pair of valve members 46, 47 on opposing ends thereof. When the valve stem is displaced upwardly, the upper valve element 46 seats against the port 40 to close off the port and prevent any inflow of drink mix into the chamber 39*b*. When the piston rod 44 is displaced downwardly, the lower valve element 47 seats against the discharge port 41 disposed at the lower end 42 of the valve housing 39*a* to prevent outflow of any drink mix flowing into the valve from the then open inlet port 40. The piston rod 44 is made to reciprocate to alternately open and close each of the ports 40 and 41 by means of an electromagnetic solenoid formed by a coil 48 disposed external to the housing 39*a* and a metallic armature 45 which is coupled to the piston rod 44. The coil 48 is energized to upwardly vertically displace the piston rod 44, thereby closing the port 40 and opening the port 41. Subsequently, the coil is de-energized and the piston rod 44 moves vertically downwardly by means of gravity assist, to close the discharge port 41 and allow drink mix to enter the valve chamber 39*b* through the port 40, filling the space 39*b* with drink mix, to define a predetermined drink mix volume. Alternatively, the coil can be energized with a reversed polarity voltage to rapidly drive the piston 44 to close the discharge port 41, rather than rely on gravity and fluid pressure to displace the piston rod when the coil 48 is de-energized.

The solenoid armature is tubularly shaped and formed of a ferromagnetic material. The tubular shape of armature 45 permits the mass of the armature to be minimized, allowing the piston rod 44 to be more quickly and easily displaced. Further, the tubular contour of armature 45 additionally reduces the volume consumed thereby, allowing the size of valve assembly 39 to be minimized as well. Further, the volume adjusting spacers 50, to be described in following paragraphs, can be located in the through bore of the tubular armature 45.

The armature 45 is secured to the piston rod 44 by means of an integrally formed clip structure. The clip structure is defined by a stop bar member 44*e* which extends laterally from the piston rod 44. A pair of cantilever arms 44*a* and 44*b* extend from the stop bar member 44*e*, with each having an extending lip 44*c*, 44*d*, respectively formed on a distal end thereof. The spacing between the two arms 44*a* and 44*b* is substantially equal to an internal diameter of the armature 45. Only one arm 44*a*, 44*b* need be displaced to release the armature 45 from the piston rod 44. The stop bar member 44*e* extends beyond the two arms 44*a* and 44*b* to block further displacement of the armature 45 when such is inserted over the arms 44*a* and 44*b*. Thus, to install the armature 45, the distal end of at least one of the arms 44*a*, 44*b* are displaced toward one another and the cylindrical armature 45 slid thereon until such is seated against the stop bar member 44*e*. The arms 44*a* and 44*b* have a length dimension sufficient for the extending ends 44*c* and 44*d* to capture the adjacent edge of the cylindrical armature 45. By that arrangement, the position of the armature 45 is securely fixed to the piston rod 44 until it is desired to remove such for cleaning or replacement. Therefore, the displacement of the armature 45 by the magnetic fields generated by coil 48 is directly transferred to the piston rod 44.

Figure 10A:
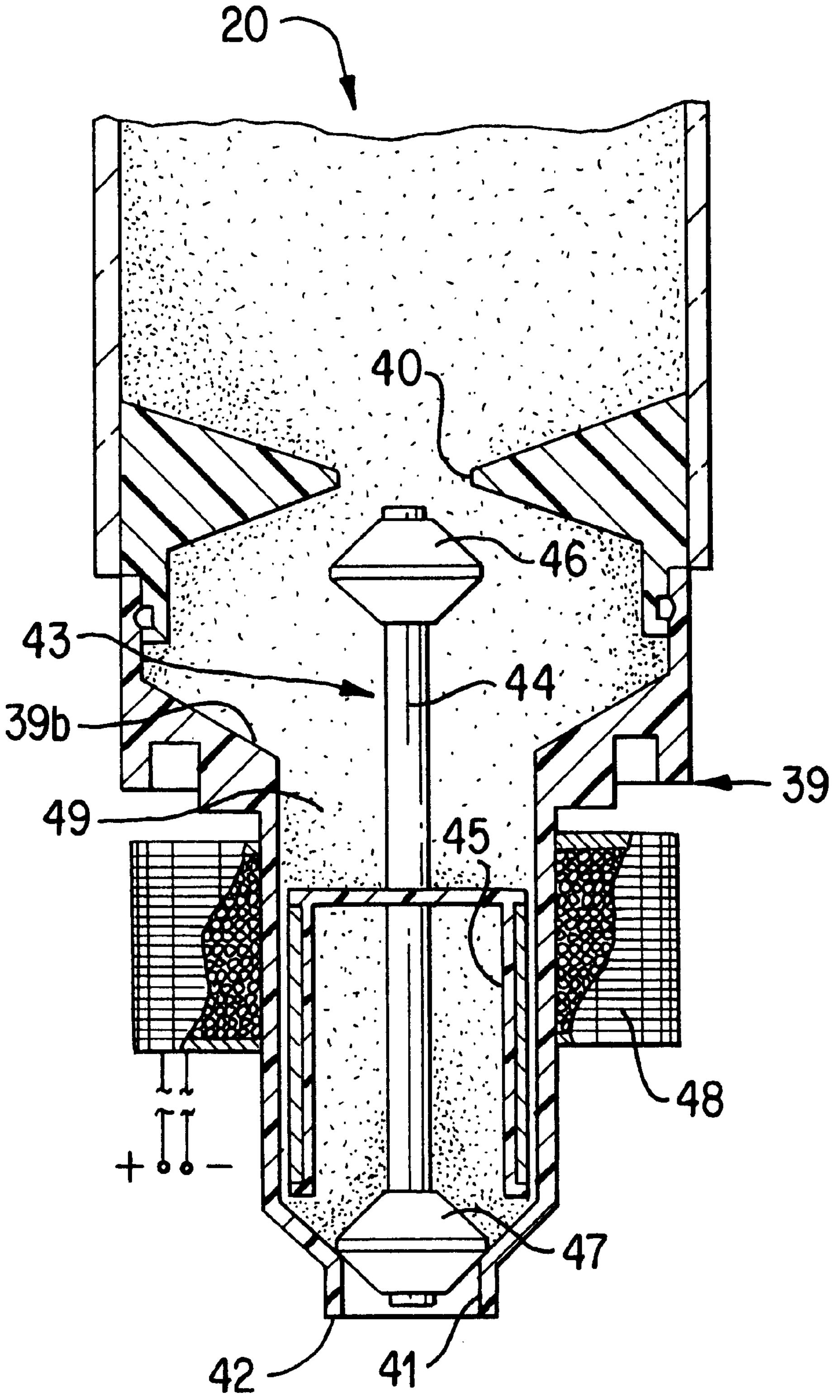
FIGS. 10A–10C are sequential views illustrating the operation of the valve assembly for dispensing a predetermined measured portion of the drink mix; and, FIG. 11 is a schematic block diagram showing the electrical connections of the present invention.

An important feature of the present invention is the precision by which the constituents of a particular beverage are dispensed and the ability to vary that proportion in a convenient and efficient manner. To fully understand the method by which such precision and interchangeability is accomplished, attention is first directed to FIGS. 10A–10C. In FIG. 10A, the piston assembly 43 is in its lowermost position within the lower portion of the interior valve space or cavity 39*b*, such that the lower valve element 47 closes the discharge port 41, and such that the upper valve element 46 opens the port 40. The drink mix from within the beverage receptacle 20 is then free to flow into the valve chamber 39*b* and fill that space. The interior space of valve chamber 39*b* defines a measured or metered volume of drink mix which flows therein from inlet port 40. The means by which that measured volume is altered will be discussed in following paragraphs.

Figure 10B:
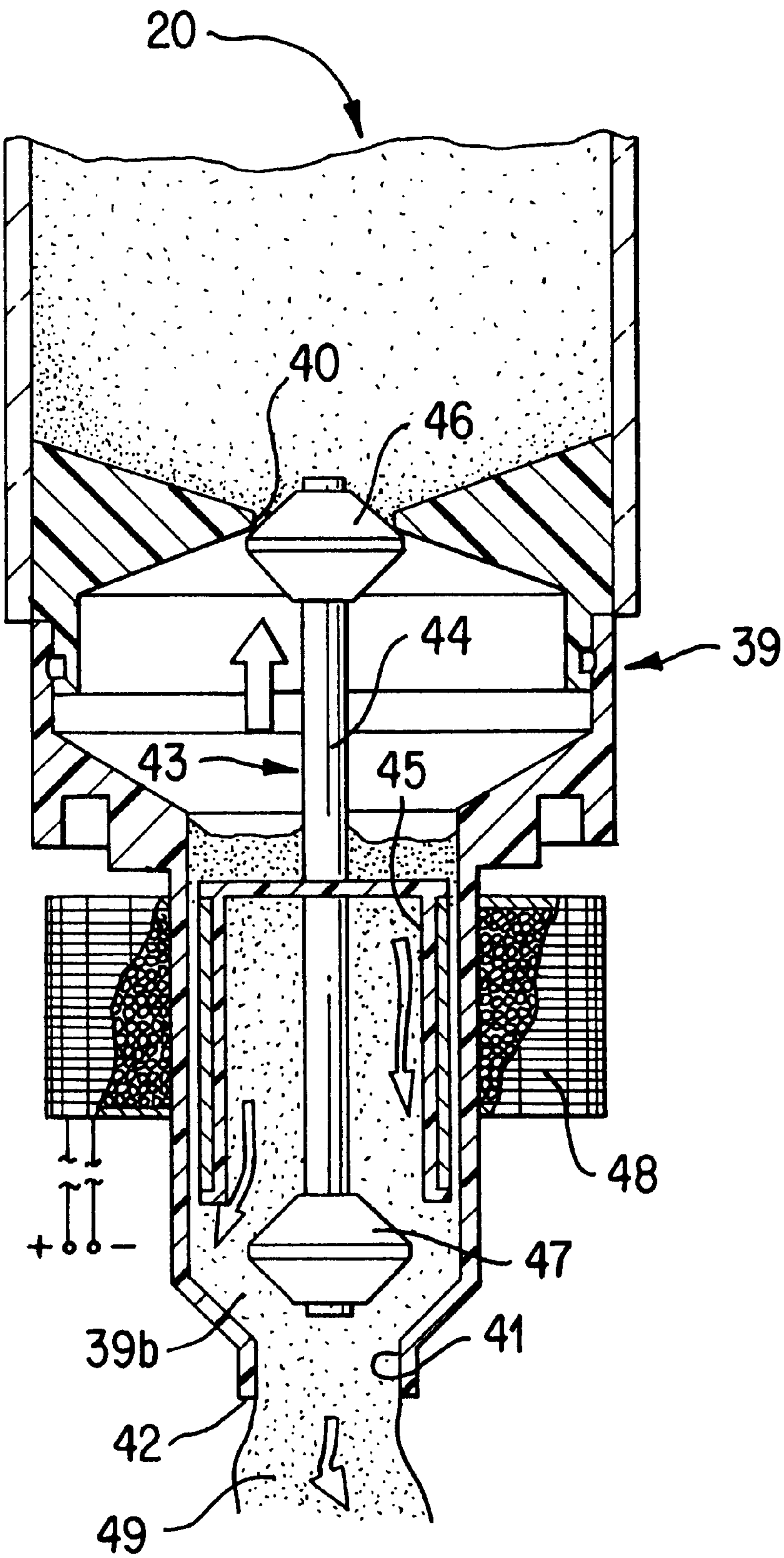
Figure 10C:
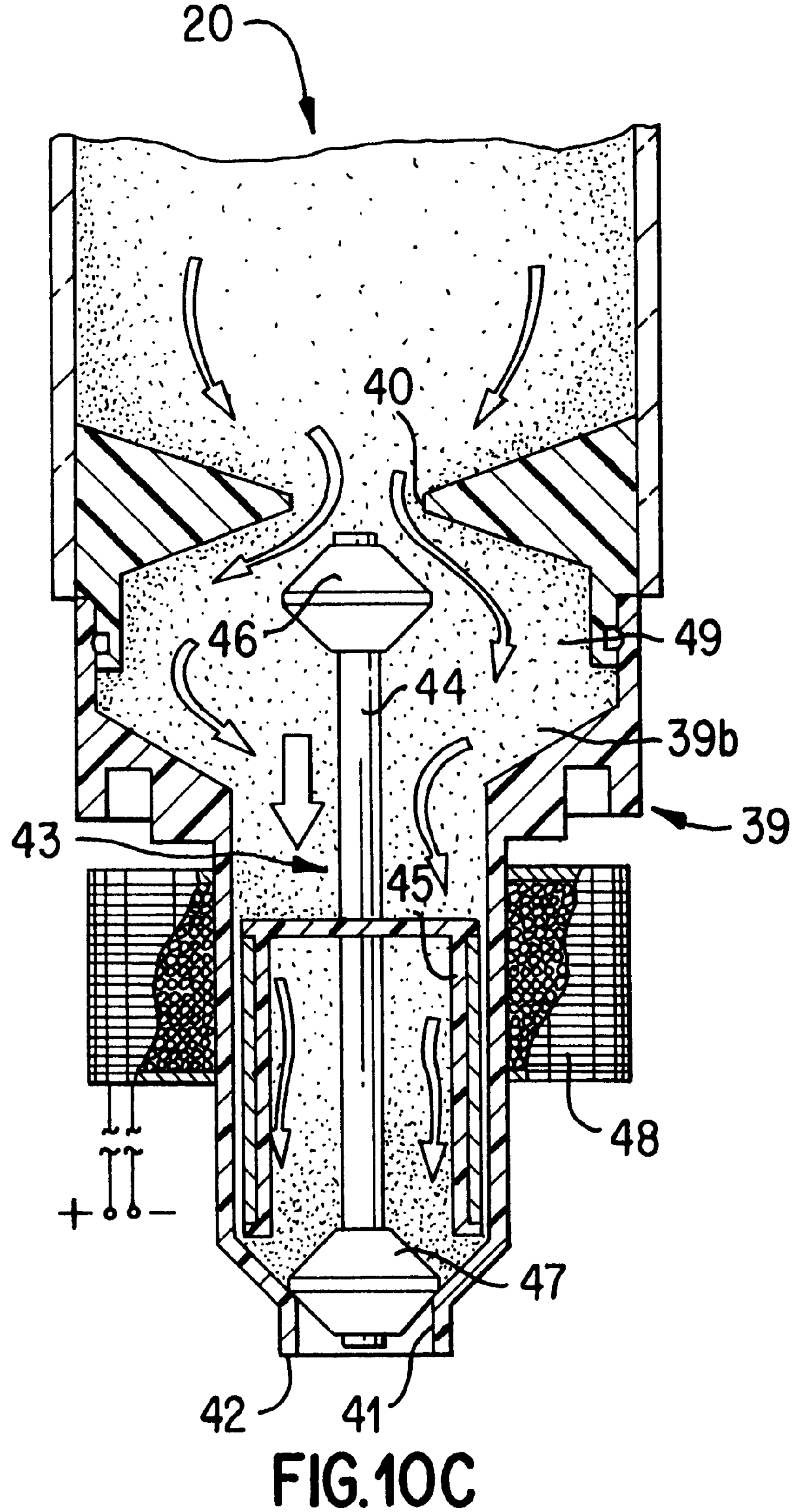

When the solenoid armature 45 is caused to be displaced by energization of the electromagnetic coil 48, as shown in FIG. 10B, the piston rod 44 is displaced therewith, such that the inlet port 40 is closed by the upper valve element 46, and the discharge port 41 is opened by displacement of the lower valve element 47. Thus, no further drink mix can flow into the valve chamber 39*b*, but the pre-measured amount of drink mix 49, which had previously filled the interior space 39*b*, flows by gravity through the discharge port 41 into the mixing container 13 of the blender 12. Thereafter, as shown in FIG. 10C, the cycle is repeated as the electromagnetic coil is de-energized or energized with a reversed polarity voltage, allowing the piston rod 44 and solenoid armature 45 to move downwardly, by gravity or magnetic forces, to the alternate position, closing the discharge port 41 with the lower valve element 47 and again opening the upper inlet port 40. With the inlet port 40 being opened, the drink mix 49 is again able to flow into the interior chamber 39*b* of the valve assembly 39 to "reload" the particular valve assembly 39 for the next dispensing cycle. When the interior space 39*b* has been filled, then again a predetermined drink mix volume is established for dispensing to the blender 12. As the volume of the interior space 39*b* is substantially constant from one drink to another, a consistent and precise portion of beverage is dispensed during each cycle of the valve assembly 39.

Referring back to FIG. 7, the receptacle 20 is shown to include a projection 20*b* extending radially outward from the lower end 20*a* for engagement with a respective annular groove 39*c* formed in the interior of the valve housing 39*a*, to provide a snap fit therebetween. Alternatively, as shown in FIG. 8, a twist lock coupling can be utilized to releasably secure the valve assembly 39 to the lower end 20*a* of receptacle 20. The lower end 20*a* of receptacle 20 is provided with a plurality of projections 20*c* angularly spaced about a bottom opening 20*d* of the receptacle 20. Valve assembly housing 39*a* includes a plurality of slotted openings 39*d* angularly spaced about an upper end thereof for cooperation with the projections 20*c* to interlock the valve assembly 39 to the receptacle 20 by positioning the projections 20*c* into the slotted openings 39*d* and rotation of the valve housing 39*a* until the projections 20*c* are positioned at the distal ends of respective slots 39*d*.

Figure 9:
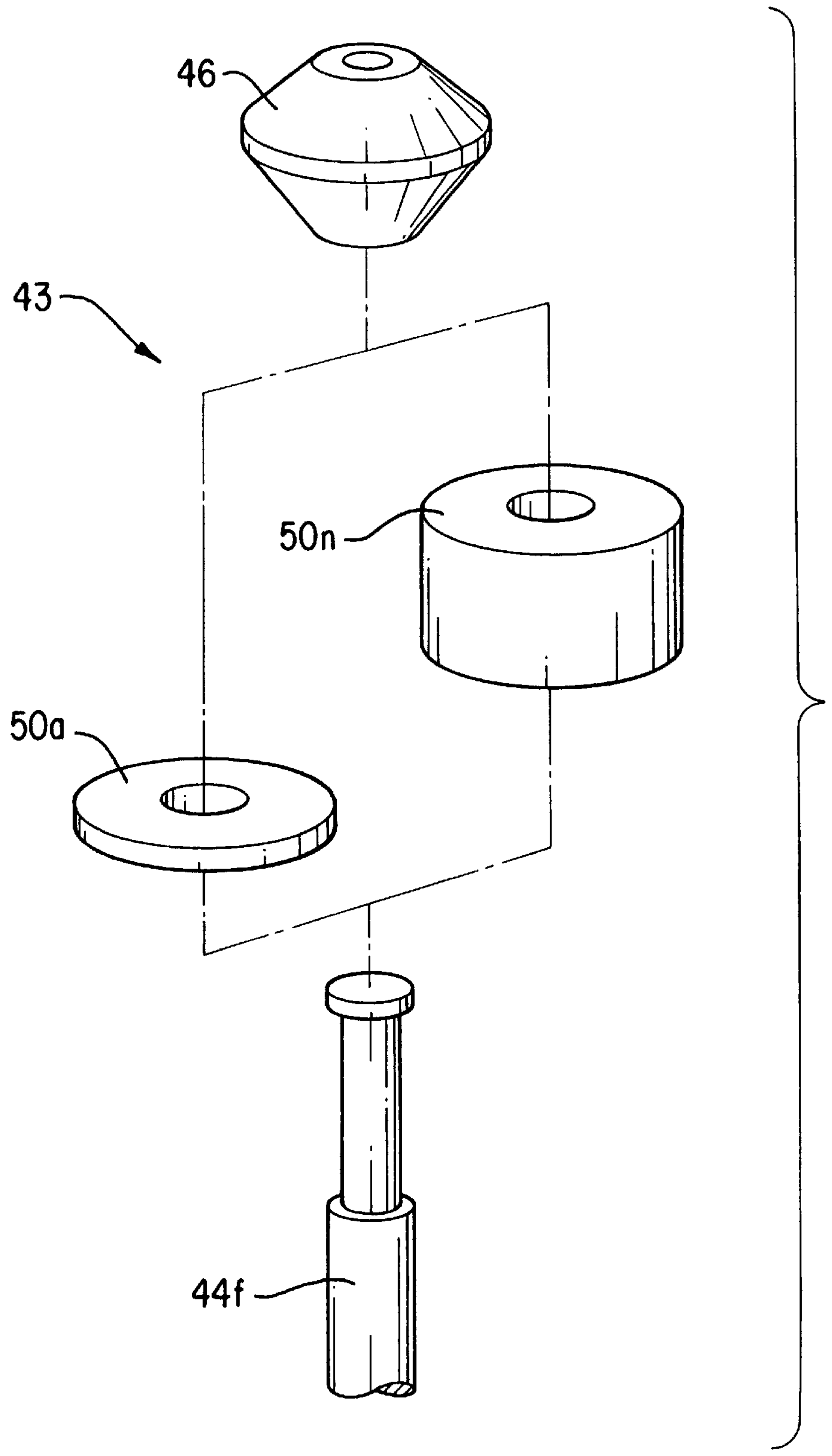
FIG. 9 is a partial perspective view of a portion of the piston subassembly illustrating the elements utilized for altering the measured volume dispensed by a respective valve.

As portion control of the constituents of the beverage is important, it is therefore important that the size of the portion delivered be easily adjusted to suit a particular application. Therefore, the interior volume of the valve space 39*b* is dimensioned to provide a maximum serving size. Where it is desired to reduce the serving size, the interior volume of the valve cavity 39*b* is reduced by the addition of one or more spacers 50 to the piston subassembly 43. The spacer 50 is inserted onto a shaft portion 44*f* and captured between the stop bar member 44*e* and the upper valve element 46. The spacer 50 may also be placed on the shaft position 44*g*, within the through bore of the tubular armature 45, captured between the stop bar member 44*e* and the lower valve element 47. As more than one spacer may be required, both shaft locations 44*f* and 44*g* may be utilized. The valve element 46, like the valve element 47, is formed of a resilient material, such as a silicone rubber, and is easily removed from the piston rod 44, allowing the size of the volume adjustment spacer 50 to be changed, or multiple spacers 50 placed in tandem on the piston rod 44. As shown in FIG. 9, the piston subassembly 43 includes a plurality of volume adjustment spacers 50*a*–50N, which may be utilized individually, or in combination to reduce the pre-measured mix portion which is delivered by the valve assembly 39. By this arrangement, it is possible to provide a drink machine where each of the receptacles 20 carries the same flavored drink mix, but where each of the valve assemblies 39 associated therewith dispense different volumes of drink mix. The volume spacers 50*a*–50N are formed of a low mass material which is compatible for contact with foodstuffs, and are in the form of an annulus which surrounds the piston rod portion 44*f*, 44*g* with an outer diameter which can vary up to the length of the stop bar member 44*e* for spacers located on shaft portion 44*f*, and up to an outer diameter that equals the distance between arms 44*a* and 44*b* for spacers mounted on shaft portion 44*g*.

Figure 11:
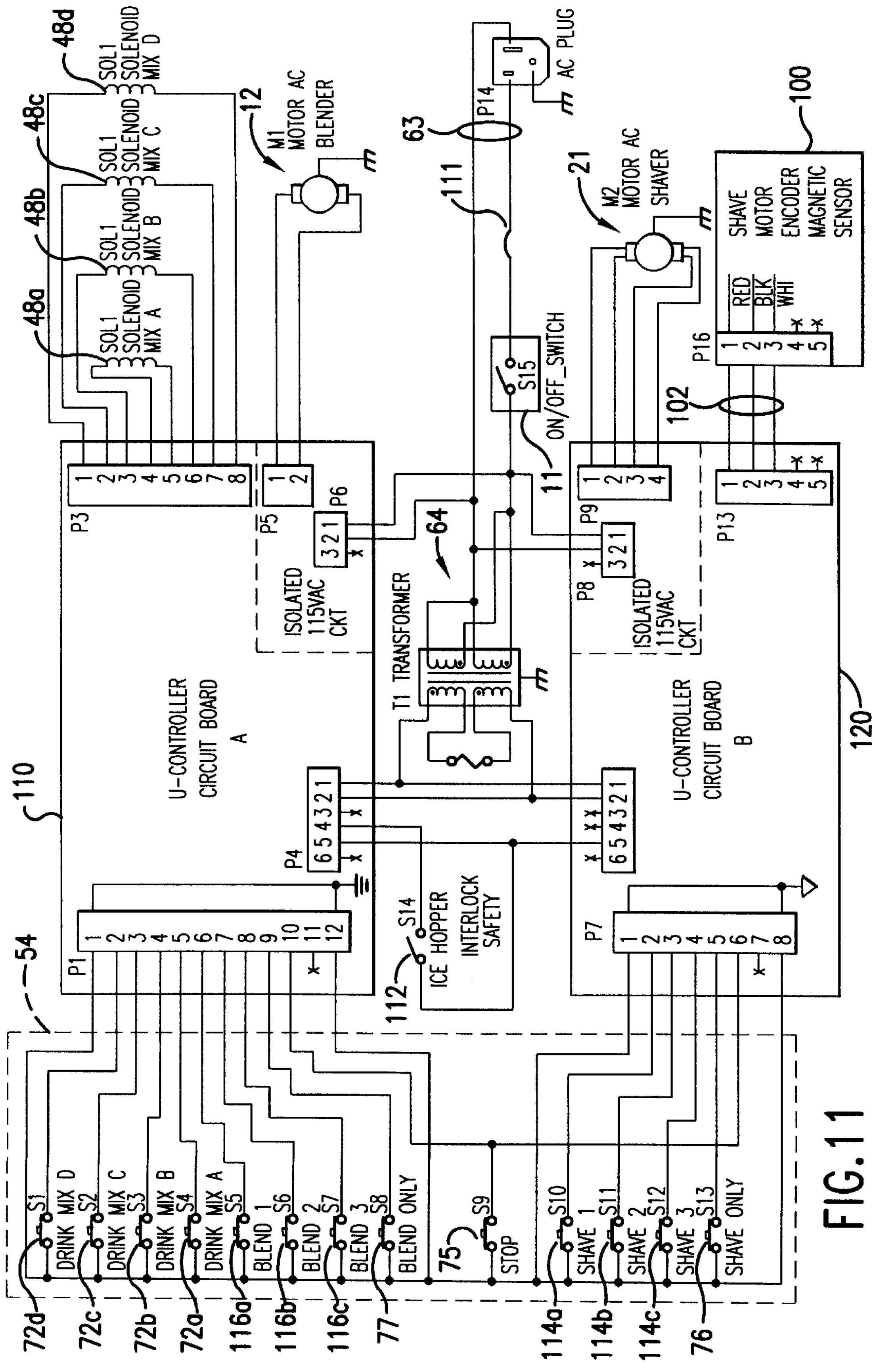

Referring now to FIG. 11, there is shown a wiring diagram for the beverage dispensing machine 10. The machine 10 is energized through a conventional electrical power cord 63 which supplies power to a DC power supply 64 through a circuit breaker Ill and the power on/off switch 11. The DC power supply 64 provides power to each of two microcontroller circuit boards 110 and 120, each of the circuit boards 110 and 120 having respective microprocessors programmed to provide independent operation of the blender 12 and ice shaver 21, respectively. The microcontroller circuit board 110 is shown to provide the control of both the blender 10 and the portion control valves 39, through control of the energization of the respective solenoid coils 48*a*, 48*b*, 48*c* and 48*d*. Thus, when an operator selects a particular drink mix by depression of the keyboard switch or selection button 72*a*, 72*b*, 72*c*, or 72*d*, the respective solenoid coil 48*a*–48*d* is energized for a predetermined time period, in order to dispense the pre-measured drink mix portion from the respective valve assembly 39.

The controller circuit board 110 also functions to control the operation of the blender 12 for any one of three predetermined time period by use of one of the blend selection buttons 116*a*, 116*b*, or 116*c*. The microcontroller circuit board 110 includes sufficient memory for the microprocessor thereof to accumulate a predetermined number of multiple switch operations. For instance, if the predetermined drink mix portion is 5 oz. and the user wishes to prepare two 5 oz. servings, or a single 10 oz. serving, the user can sequentially press one of the drink mix selection buttons 72*a*–72*d* two times. The number of servings which can be sequentially combined is limited only by the size of the mixing container 13 of blender 12. In one working embodiment, that limitation is three servings, and for such the invention has been illustrated with blending selection buttons for three different operating time periods. Obviously, if the size of the machine were scaled upwardly to provide for a larger capacity mixing chamber, then the number of sequential servings which can be combined can then be increased, as would the number of blender operation selections.

It has been found that a larger volume of drink mix and ice require a longer blending time than is required when the volume is less. By offering three blend selection buttons 116*a*–116*c*, the user is provided with the appropriate preprogrammed blending time cycles appropriate for the size of the serving being blended. Hence if the user has selected to double the serving size by depressing and releasing the drink mix selection button 72*b* two times, the user would then depress the blend selection button 116*b* to provide the appropriate blend cycle timing. The user then must select the appropriate volume of shaved ice to complete the beverage, and such is accomplished by depressing the corresponding shaved ice selection button 114*a*, 114*b*, or 114*c*.

The shaved ice selection buttons 114*a*–114*c* provide an input to the second microprocessor controller circuit board 120. The microprocessor controller circuit board 120 has been programmed to drive the ice shaver 21 to deliver predetermined amounts of shaved ice. In fact, and most importantly, the ice shaver 21 is controlled to deliver very precise amounts of shaved ice, irrespective of the hardness of the ice cubes which are delivered to the hopper defined by the rear compartment 18 of the upper housing 15. The precise delivery of shaved ice is accomplished by monitoring the rotation of the blades, as opposed to providing a timed operational cycle, as is conventional in the art. Although the solenoid coils 48 have been illustrated as being controlled by the microcontroller circuit board 110, such could be controlled instead by the microcontroller circuit board 120.

Figure 4:
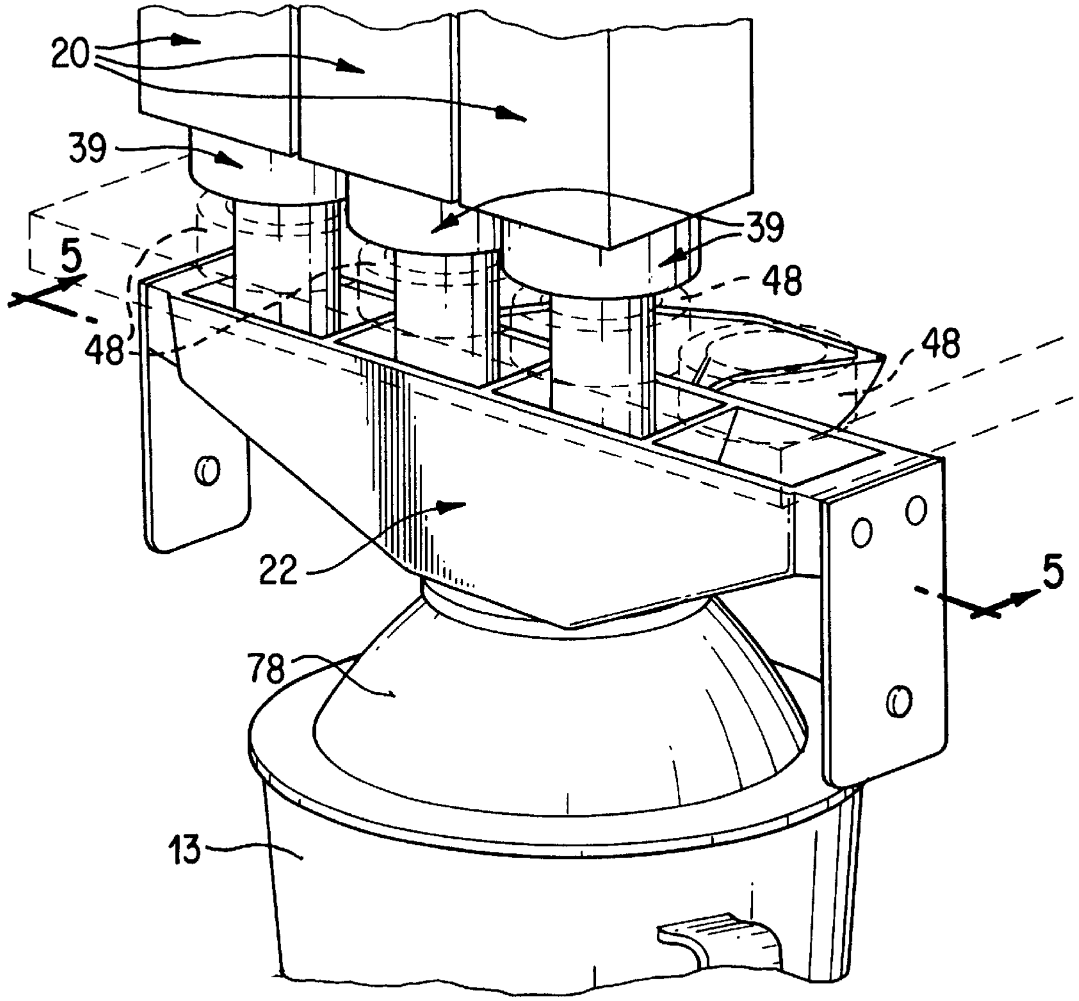
FIG. 4 is a partial exploded perspective view showing the lower portion of the beverage receptacles, the manifold connecting the receptacles to the blender, and the top of the blender jar with an elastomeric seal.

Referring back to FIG. 2, it can be seen that the ice shaver assembly 21 includes a magnetic encoder sensor 100 positioned to detect the passage of each of the rotary blades 36. Thus, for a machine having four rotary blades, as represented in FIG. 4, the sensor 100 can detect each quarter of a revolution of the blades of ice shaver 21. Each time a rotary blade 36 passes the stationary blade 37, a precise amount of ice is shaved, provided that there is a sufficient reservoir of ice cubes 19 in the chamber 18. However, the hardness of ice is not uniform and where the ice is very hard, the motor driving the rotary blades 36 will be loaded sufficiently to cause what is known in the art as "slip". In fact, in systems where the rotary blades are belt driven, a mechanical slip can also result in that transmission system in addition to the "slip" in the motor, where very hard ice is being shaved. If the ice shaving process were controlled by simply a timed cycle, then less shaved ice would be delivered when hard ice cubes are utilized. As the food service industry does not have the ability to tightly control the hardness of the ice which is utilized, inconsistent drink consistency results from the differences in shaved ice volume that occurs in correspondence to the differences hardness in batches of ice cubes 19 supplied to the machine.

Through use of the sensor 100 and the controller 120, the precise amount of shaved ice is consistently delivered from ice shaver 21 to the blender container 13, irrespective of ice hardness. The sensor 100, having a cable 102 which is coupled to the controller 120 detects the passage of each rotary blade 36 of the ice shaver 21, and utilizing a counting program in the microprocessor of controller 120, a precise number of rotations of the cutting blades is provided. As such counting programs are known in the art, the details of such are not further described herein. Thus, when the user selects the ice shaver operation with the selection switch 114*a*, the ice shaver 21 is energized to operate for a predetermined number of rotations of the rotary blades 36, which in the case of a four blade cutting head can be as precise as a quarter of a revolution thereof. If the user selects the switch 114*b*, corresponding to the selection of a two serving drink, the shaver is controlled to operate for a greater number of revolutions in order to provide the predetermined amount of ice which would correspond to a drink having a greater volume of drink mix. Likewise, the selection of switch 114*c*, corresponds to the three serving selection of drink mix and blender operation and provides a corresponding greater amount of ice by a larger number of rotations of the rotary blades.

If at any time the user wishes to stop the operation of the machine, the selection switch 75 is depressed. Switch 75 is coupled to both the controller circuit board 110 and the controller circuit board 120 to stop either or both of the blending and shaver operations. A safety interlock switch 112 is also incorporated into the machine to prevent operation of either the blender or shaver if the upper housing 15 is removed from the upper end of the machine to prevent any inadvertent contact with the rotating elements of the machine. Although one might combine the functions of controller circuit board 110 and controller circuit board 120 with a single microprocessor, the beverage dispensing machine 10 is intended for commercial applications wherein the machine is continually used, sequentially, to make a multiplicity of drinks. By separating the operation of the blender motor with a separate controller from that of the ice shaver, greater isolation between the controlled devices is achieved to thereby increase the reliability of the system.

In use, the operator in quick succession operates a drink selection switch, a blend selection switch and an ice shaver selection switch. Each of the devices which are operated responsive to those selections has certain surge currents and voltages associated with the operation thereof. By separating two of the largest surge producers to be separately controlled, the potential of one interfering with the other is significantly reduced. Further, the separation of the controlled blender and shaver to two separate controllers allows for the simultaneous operation thereof. By the arrangement of the keyboard 55 shown in FIG. 1, the blend selection switches 116 and the ice shaver selection switches 114 are placed in closed proximity to one another and in corresponding relationship so that a user can depress corresponding switches with two fingers of one hand at the same time. Conventional microprocessor controllers cannot normally handle the input of two simultaneous switch functions. By separation of the control of the blender from that of the ice shaver, the user is able to depress both switches simultaneously, saving steps and time in making the selected beverage, which is particularly important in a commercial environment and greater isolation between the ice shaver and blender is achieved. Further, the operator may manually control the operation of the blender and ice shaver. If the user presses and holds the blend only selection button 77 the blender is continuously operated as long as the switch 77 is closed. Likewise, the user may select the ice shave only selection button 76 wherein the rotary blades 36 of ice shaver 21 are rotated continuously as long as the switch 76 is closed. As shown in FIG. 1, the switch buttons 76 and 77 are located in close proximity to one another, allowing the user to depress both simultaneously to manually operate both the blender and ice shaver 21 together.

In summary, the beverage dispensing machine 10 is provided with a control panel subassembly 52 that includes a control panel 54 and a pair of microcontroller circuit boards 110 and 120. The control panel 54 includes a keyboard 55 surrounded by a bezel 53. Keyboard 55 includes a plurality of drink mix selection buttons 72 (shown in FIGS. 1 and 6), and a display 51, which may be an alphanumeric display to assist a user in operating the machine and for providing audit data. The operator utilizes the selection control 72 to initiate the dispensing of a pre-measured portion of a particular drink mix contained in one of the receptacles 20. The user, by operating this switch multiple times, can increase the pre-measured portion in integral increments thereof. In correspondence with the pre-measured drink mix portion, the user selects a blender operation cycle utilizing one of the blender selection switches 116. Finally, a precise shaved ice portion is selected utilizing the shaved ice selection buttons 114. By virtue of the ice shaver and blender being separately controlled by independent microcontroller circuit boards 110 and 120, the user may simultaneously depress a selection switch 116 and a selection switch 114 to initiate the operation of both the blender and ice shaver together.

The drink mix 49 is pre-measured by virtue of the internal cavity 39b of the valve assembly 39. That volume can be reduced by the addition of one or more volumetric adjustment spacers 50 that are added to the piston subassembly 43. The volumetric adjustment spacers 50 are provided in multiple sizes to provide a selection of spacers 50*a*–50N which may be utilized singly, or in combination to vary the internal volume space that defines the pre-measured drink mix volume supplied to the blending container 13 of blender 12. The spacers 50*a*–50N are low mass annular members which are easily installed on the piston rod shaft 44*f,* 44*g* after removal of a respective valve element 46. Subsequent to installation of one or more spacers 50, the valve element 46, 47 may be reinstalled onto the piston rod 44.

The piston rod 44 is displaced by the action of a solenoid formed by a solenoid armature 45 releasably coupled to piston rod 44 and an electromagnetic coil 48 which surrounds the exterior of the housing 39*a* of valve assembly 39. By virtue of the cylindrical shape of the solenoid armature 45, such minimizes its mass, and allows for a quicker response in displacing the piston rod 44 and a minimization of the size of the electromagnetic coil 48. The through bore of armature 45 also provides space for installation of volume adjustment spacers 50. The solenoid armature 45 is releasably, but securely coupled to the piston rod 44 by means of a pair of resilient arms 44*a* and 44*b* which extend from a stop member or bar 44*e*. The stop member extends beyond the arms 44*a,* 44*b* to block one end of the solenoid armature 45, and the other end is blocked by projecting distal ends 44*c,* 44*d* of the resilient arms 44*a*, 44*b,* respectively. By that arrangement, the solenoid armature is easily installed and removed from the piston rod 44, without disturbing the lower valve element 47, providing for quick and efficient disassembly when the valve assembly 39 is cleaned, or refurbished.

Of particular significance, is the precision with which shaved ice can be provided to the beverage. By delivering a uniformly consistent quantity of ice the dispensing machine 10 can deliver completed beverages which are likewise uniformly consistent, from one drink to the next, irrespective of the hardness of ice which is utilized. The dispensing machine 10 by virtue of the use of a rotary encoder which controls the operation of the ice shaver by controlling the number of rotations of the ice shaving blades, rather than simply operating the shaver for a predetermined time cycle. Although a magnetic encoder has been illustrated, other types of rotary encoders can be employed, such as optical, capacitive and mechanical type encoders. Thus, where hard ice causes slip in the motor and/or in the mechanical coupling between the motor and the rotary shaving blades, such is compensated for by the microcontroller circuit board 120, which continues the operation of the shaver until a predetermined number of blade rotations has been completed. Therefore, the magnetic sensor 100 which monitors the blade rotation allows the microcontroller 120 to encode such rotation and provide a count which is compared with a predetermined number, that number being related to the amount of ice to be delivered.

The combination of precise shaved ice delivery, a low mass valve structure which can be rapidly operated, and a dual control architecture which allows the user to simultaneously initiate dispensing of the shaved ice and the blending operation, improves the efficiency of beverage preparation, allowing a user to produce more drinks per unit time than was previously possible. Further, by virtue of the separate control of both the blender and ice shaver, the beverage dispensing machine 10 is not limited to providing frozen type beverages, as the proportions of drink mix and shaved ice can be varied to other that what would normally be selected for a frozen type drink. That is to say, that the user may select delivery of two or three servings of drink mix while selecting only a single serving of shaved ice to provide a beverage which is substantially liquid, as opposed to a slush-type consistency that is achieved when the number of servings of drink mix and shaved ice correspond. The user may select a single serving of drink mix and manually add shaved ice using switch 76 to provide a more liquid, rather than slush type drink.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

We claim:

1. A machine for dispensing beverages of substantially uniform consistency containing shaved ice, comprising:

a housing;

blending means disposed within said housing for blending constituents of a beverage for a predetermined time period;

a plurality of receptacles disposed within said housing for holding respective drink mixes therein;

means located in said housing and coupled in fluid communication with said plurality of receptacles for delivering a measured volume of a selected drink mix to said blending means; and, ice shaver means located in said housing for delivering a precise amount of shaved ice to said blending means, said ice shaver means including a rotating ice shaving blade and means for controlling rotation of said ice shaving blade to rotate through a predetermined number of revolutions, wherein a predetermined quantity of ice is consistently delivered to said blending means irrespective of a hardness of ice being shaved.

2. The machine as recited in claim 1 where said means for controlling rotation of said ice shaving blade includes a sensor for detecting passage of said ice shaving blade thereby.

3. The machine as recited in claim 2 where said blending mean includes means for controlling said blending means to operate for a predetermined duration.

4. The machine as recited in claim 1 where said means for delivering a measured volume includes a plurality of valves respectively coupled to said plurality of receptacles, each of said valves including an internal chamber having fluid receiving volume of predetermined size alternately filed by a respective drink mix and released therefrom to define said measured volume thereof.

5. The machine as recited in claim 4 where each of said valves includes means for altering said predetermined size of said fluid receiving volume.

6. The machine as recited in claim 4 where each of said valves includes (a) an inlet port coupled in fluid communication with a respective one of said plurality of receptacles, (b) a discharge port coupled in fluid communication with said blending means, (c) a piston rod displaceably mounted within said internal chamber, (d) a first valve element coupled to one end of said piston rod for closing said inlet port responsive to displacement of said piston rod in a first direction, (e) a second valve element coupled to an opposing end of said piston rod for closing said discharge port responsive to displacement of said piston rod in a second direction, (f) an electromagnetic coil mounted external to said internal chamber, (g) a solenoid armature secured to said piston rod for displacement thereof in said first and second directions, and means integrally formed on said piston rod for releasably coupling said solenoid armature thereto.

7. The machine as recited in claim 6 where said releasable coupling means includes at least one resilient arm integrally formed on said piston rod in one piece formation for engaging said solenoid armature.

8. The machine as recited in claim 7 where said releasable coupling means includes a pair of resilient arms integrally formed on said piston rod in one piece formation and laterally spaced one from the other for engaging said solenoid armature.

9. The machine as recited in claim 7 where said solenoid armature has a tubular contour with an internal diameter greater than an external diameter of at least one of said first and second valve elements.

10. The machine as recited in claim 9 where each of said valves includes means for altering said predetermined size of said fluid receiving volume.

11. The machine as recited in claim 10 where said means for altering said predetermined size of said fluid receiving volume includes a plurality of annular spacer elements mountable on said piston rod between said at least one resilient arm and one of said first and second valve elements.

12. The machine as recited in claim 3 where said means for delivering a measured volume includes a plurality of valves respectively coupled to said plurality of receptacles, each of said valves being electrically coupled to said means for controlling said blending means for controlling operation of said valves responsive to a drink mix selection input to said means for controlling said blending means.

13. A machine for dispensing beverages of substantially uniform consistency containing shaved ice, comprising:

a housing;

blending means disposed within said housing for blending constituents of a beverage;

ice shaver means located in said housing for delivering a predetermined amount of shaved ice to said blending means;

a first controller electrically coupled to said ice shaver means for controlling said delivery of said predetermined amount of shaved ice;

a second controller separate and distinct from said first controller and electrically coupled to said blending means for controlling said blending means to operate for a predetermined duration;

a plurality of receptacles disposed within said housing for holding respective drink mixes therein; and, means located in said housing and coupled in fluid communication with said plurality of receptacles for delivering a measured volume of a selected drink mix to said blending means, said means for delivering a measured volume being electrically coupled to one of said first and second controllers for initiating dispensing of said measured volume of the selected drink mix.

14. The machine as recited in claim 13 where said ice shaver means includes a rotating ice shaving blade and said first controller includes means for controlling rotation of said ice shaving blade to rotate through a predetermined number of revolutions.

15. The machine as recited in claim 14 where said first controller includes a sensor for detecting passage of said ice shaving blade thereby.

16. The machine as recited in claim 14 where said means for delivering a measured volume is electrically coupled to said second controller.

17. A machine for dispensing beverages of substantially uniform consistency containing shaved ice, comprising:

a housing;

blending means disposed within said housing for blending constituents of a beverage for a predetermined time period;

ice shaver means located in said housing for delivering a predetermined amount of shaved ice to said blending means;

a plurality of receptacles disposed within said housing for holding respective drink mixes therein; and, means located in said housing and coupled in fluid communication with said plurality of receptacles for delivering a measured volume of a selected drink mix to said blending means, said means for delivering a measured volume including:

(a) a plurality of valves respectively coupled to said plurality of receptacles, each of said valves including an internal chamber having a fluid receiving volume of predetermined size alternately filed by a respective drink mix and released therefrom to define said measured volume thereof; and, (b) means for altering said predetermined size of said fluid receiving volume, said means for altering said predetermined size of said fluid receiving volume includes a plurality of low mass annular spacer elements selectively releasably coupled within said internal chamber for reducing said fluid receiving volume.

18. The machine as recited in claim 17 where each of said plurality of valves includes (a) an inlet port coupled in fluid communication with a respective one of said plurality of receptacles, (b) a discharge port coupled in fluid communication with said blending means, (c) a piston rod displaceably mounted within said internal chamber, (d) a first valve element coupled to one end of said piston rod for closing said inlet port responsive to displacement of said piston rod in a first direction, (e) a second valve element coupled to an opposing end of said piston rod for closing said discharge port responsive to displacement of said piston rod in a second direction, (f) an electromagnetic coil mounted external to said internal chamber, (g) a solenoid armature secured to said piston rod for displacement thereof in said first and second directions, and means integrally formed on said piston rod for releasably coupling said solenoid armature thereto.

19. The machine as recited in claim 18 where said releasable coupling means includes at least one resilient arm integrally formed on said piston rod in one piece formation for engaging said solenoid armature.

20. The machine as recited in claim 19 where said solenoid armature has a tubular contour with an internal diameter greater than an external diameter of at least one of said first and second valve elements.

21. The machine as recited in claim 20 where said plurality of low mass annular spacer elements are selectively and releasably mountable on said piston rod between said at least one resilient arm and one of said first and second valve elements.

* * * * *